(12) United States Patent
Sanft et al.

(10) Patent No.: US 8,959,619 B2
(45) Date of Patent: Feb. 17, 2015

(54) GRAPHICAL IMAGE PASSWORD AUTHENTICATION METHOD

(75) Inventors: Ted Sanft, Franklin, TN (US); John Overland, Brentwood, TN (US); Andy Roberts, Granbury, TX (US)

(73) Assignee: Fleet One, LLC., Antioch, TN (US)

( * ) Notice: Subject to any disclaimer, the term of this patent is extended or adjusted under 35 U.S.C. 154(b) by 54 days.

(21) Appl. No.: 13/333,327

(22) Filed: Dec. 21, 2011

(65) Prior Publication Data

US 2013/0167225 A1  Jun. 27, 2013

(51) Int. Cl.
*G06F 21/00* (2013.01)

(52) U.S. Cl.
USPC ............. 726/18; 726/17; 726/19; 713/182; 713/183; 713/184; 713/185

(58) Field of Classification Search
USPC ............................................. 726/18
See application file for complete search history.

(56) References Cited

U.S. PATENT DOCUMENTS

| | | | |
|---|---|---|---|
| 6,209,104 B1 * | 3/2001 | Jalili | 726/18 |
| 7,266,693 B1 | 9/2007 | Potter et al. | |
| 7,430,758 B2 | 9/2008 | Toutonghi | |
| 7,941,834 B2 | 5/2011 | Beck et al. | |
| 8,006,300 B2 | 8/2011 | Mizrah | |
| 8,010,996 B2 | 8/2011 | Cline et al. | |
| 2002/0073343 A1 | 6/2002 | Ziskind et al. | |
| 2003/0065952 A1 | 4/2003 | Otsuka | |
| 2003/0210127 A1 | 11/2003 | Anderson | |
| 2005/0010768 A1 | 1/2005 | Light et al. | |
| 2006/0156016 A1 * | 7/2006 | Tanaka | 713/182 |
| 2006/0248344 A1 | 11/2006 | Yang | |
| 2007/0277224 A1 | 11/2007 | Osborn et al. | |
| 2008/0046968 A1 | 2/2008 | Cline et al. | |
| 2008/0098464 A1 | 4/2008 | Mizrah | |
| 2008/0141342 A1 | 6/2008 | Curnyn | |
| 2008/0244700 A1 | 10/2008 | Osborn et al. | |
| 2008/0250481 A1 | 10/2008 | Beck et al. | |
| 2009/0077653 A1 | 3/2009 | Osborn et al. | |
| 2010/0043062 A1 | 2/2010 | Alexander et al. | |
| 2010/0083353 A1 | 4/2010 | Wang | |
| 2010/0218240 A1 | 8/2010 | Chiruvolu | |
| 2011/0138446 A1 | 6/2011 | Barrett et al. | |
| 2011/0202982 A1 | 8/2011 | Alexander et al. | |
| 2011/0239272 A1 | 9/2011 | Stone | |

FOREIGN PATENT DOCUMENTS

WO   WO 2007/139644   12/2007

OTHER PUBLICATIONS

Mendori et al. (International Conference on Computer Education—ICCE' 2002).*

* cited by examiner

*Primary Examiner* — Longbit Chai
(74) *Attorney, Agent, or Firm* — Stephen J. Weyer, Esq.; Stites & Harbison, PLLC

(57) ABSTRACT

A method for secure authentication is provided which includes having a user who wishes to gain access to a computer or computer network select from among a plurality of randomly displayed images, having different background colors, the correct image and background color which correspond to the user's computer account. In one advantageous form, in addition to selecting the correct image, the user must first enter a username and password. In an alternative form, if a user is seeking access to a computer network by using a preapproved access point or computer having an approved IP address, a user is allowed to gain access to the computer network without being prompted to select a correct image.

15 Claims, 8 Drawing Sheets

GRAPHICAL IMAGE PASSWORD AUTHENTICATION METHOD

FIELD OF THE INVENTION

The present invention relates to an authentication method and, in particular, a graphical image password authentication method which can be used to access a computer system or network.

BACKGROUND OF THE INVENTION

Limiting access to a computer, computer network or computer system is often a high priority. Several systems have been developed which limit access by using passwords separately or in combination with a username, biometrics and/or responses to queries posed to a user desiring computer access.

Increasingly, users seeking access to a computer system or network often do so using public computers, such as computers not controlled by the owner of a computer network or computer system to which a user wishes access. Such computers include computers at hotels, libraries, individual homes and schools, just to name a few. In addition, often a user accesses a computer network by using a public entry point, such as a public Wi-Fi hot spot, home computer network, an Internet Service Provider ("ISP"), wireless broadband carrier, or other wireless or hardwired router other than that of the computer system which the user ultimately wishes to gain access.

One security issue which arises with a user accessing a computer network using a public computer or entry point is that the public computer or entry point is not necessarily secure, i.e. one can either intercept a transmission as a user gains access to the computer network, or the public computer or public access point may retain authentication data of the user as he or she authenticates access to the computer network. One potential security issue is that unauthorized access may be obtained by using data which is intercepted as the authorized user accesses the computer network or by using authentication information which has previously been stored on the computer or intermediate router or server as the authorized user gains access to the computer network.

An additional security issue arises from spyware which can record conventional username and password entries as an authorized user accesses a computer network. For example, spyware can track and store keystrokes as an authorized user uses a non-secure computer and then relays the recorded information to allow unauthorized access to the computer network. Yet another security issue arises when an unauthorized person or camera observes an authorized user's entry of a username and password while in public.

Several recent additional methods for authentication include displaying images randomly on a computer screen from which a user must select a correct image before being allowing access to the computer network. For example, U.S. Patent Application Publication Nos. 2011/0202982 and 2007/0277224 both describe respective methods for authenticating a user who correctly identifies a random image displayed on a computer screen. However, these methods still have some of the same disadvantages as other prior authentication methods in terms of being susceptible to spyware and/or data interception.

In addition to accurately authenticating a user's access to a computer system, it is also beneficial to give feedback to a user that he or she is attempting to access the correct network. For example, prior to a user divulging personal information, a user would be provided indicia that the computer network, in fact, is the network to which the user wishes to gain access. Several methods include displaying a previously selected image to a user upon access into the network. A user, seeing the previously selected image, would know that he or she is, in fact, accessing the correct network. Conversely, if the user is not shown the previously selected image or is shown an incorrect image, the user would not that he or she has not accessed the correct computer network.

SUMMARY OF THE INVENTION

The present invention relates to a method for secure authentication in which a user gains access to a computer or network after selecting the correct randomly displayed image having a random background color from a plurality of random images having random background colors. The secure authentication method may include an enrollment process. The enrollment process includes creating a user account for a user and allowing a user to preselect one of a plurality of images and a background color from a plurality of background colors. When the user wishes to gain access to a computer or computer network, the user will be presented with a number of random images having random background colors. The user must select the correct image having the correct background color from all of the images having random background colors.

The secure authentication method can be further enhanced by including a user password with the user account. In order to gain access, a user will first be prompted to enter his or her username or Login ID, followed by a password. Then, the user will be presented with a plurality of random images with random background colors from which to select the correct image with correct background color in order to gain access to the computer or computer network.

In an alternative further form, the secure authentication method first determines a user's IP address after a user enters his or her username and password. If the IP address corresponds to an IP address previously identified as an approved IP address, the user is allowed access to the computer or computer network without having to select his or her previously selected image and background color.

The present invention, in one form, relates to a method for secure authentication. The method includes creating a user account for a user. The user account comprises account information, including a username or Login ID, an image selected from a plurality of images, and a background color selected from a plurality of colors for the background color of the image. A user is allowed to access a computer via a user interface. The user is presented with a plurality of random images having random background colors in random order on the user interface. One of the plurality of random images is the image with background color associated with the user account. A selection from the user is received which corresponds to one of the images presented on the user interface. The user is authenticated as an authorized user if the user selects the image with background color corresponding to the user account.

In one specific further form, the method also includes creating a user account. The method includes presenting the user with a plurality of image categories. A user selects one of the plurality of image categories. The user is then presented with a plurality of images corresponding to the selected image category. A user then selects one of the plurality of images. Next, the user is presented with a plurality of background colors. The user subsequently selects one of the plurality of background colors.

The present invention, in another form thereof, relates to a method for secure authentication. The method includes creating a user account which comprises information, including a username or a Login ID, an image selected from a plurality of images, and a background color selected from a plurality of colors for the background color of the image. A user is allowed access to a computer via a user interface. An IP address for the user interface is determined. The IP address is compared with IP addresses in an IP address database. If the IP address is in the IP database, the user interface is identified as an authorized IP address and the user is authenticated as an authorized user. If the IP address is not in the IP address database, the method further includes presenting the user with a plurality of random images having random background colors in random order on the user interface. One of the plurality of random images is the image with the background color associated with the user account. A user then selects one of the images presented on the user interface and the user is authenticated as an authorized user, if the user selects the image with background color corresponding to the user account.

The present invention, in another form thereof, relates to a system for authentication. The system includes a computer user interface, computer memory, and a computer processor adapted for executing computer instruction. Computer instruction includes:

presenting a plurality of random images having random background colors in random order on the computer user interface, one of the plurality of random images is an image with a background color associated with the user account;

receiving a selection from the user of one of the images presented on the computer user interface; and authenticating the user as an authorized user if the user selected the image with the background color corresponding to the user account.

BRIEF DESCRIPTION OF THE FIGURES

The invention will be explained in more detail below, with reference to particularly preferred embodiments, as well as the drawings, in which.

Other embodiments and features of the present invention will become apparent from the following detailed description considered in conjunction with the accompanying drawings. It is to be understood, however, that the drawings are designed as an illustration only and not as a definition of the limits of the invention.

DETAILED DESCRIPTION OF THE INVENTION

Figure 1:
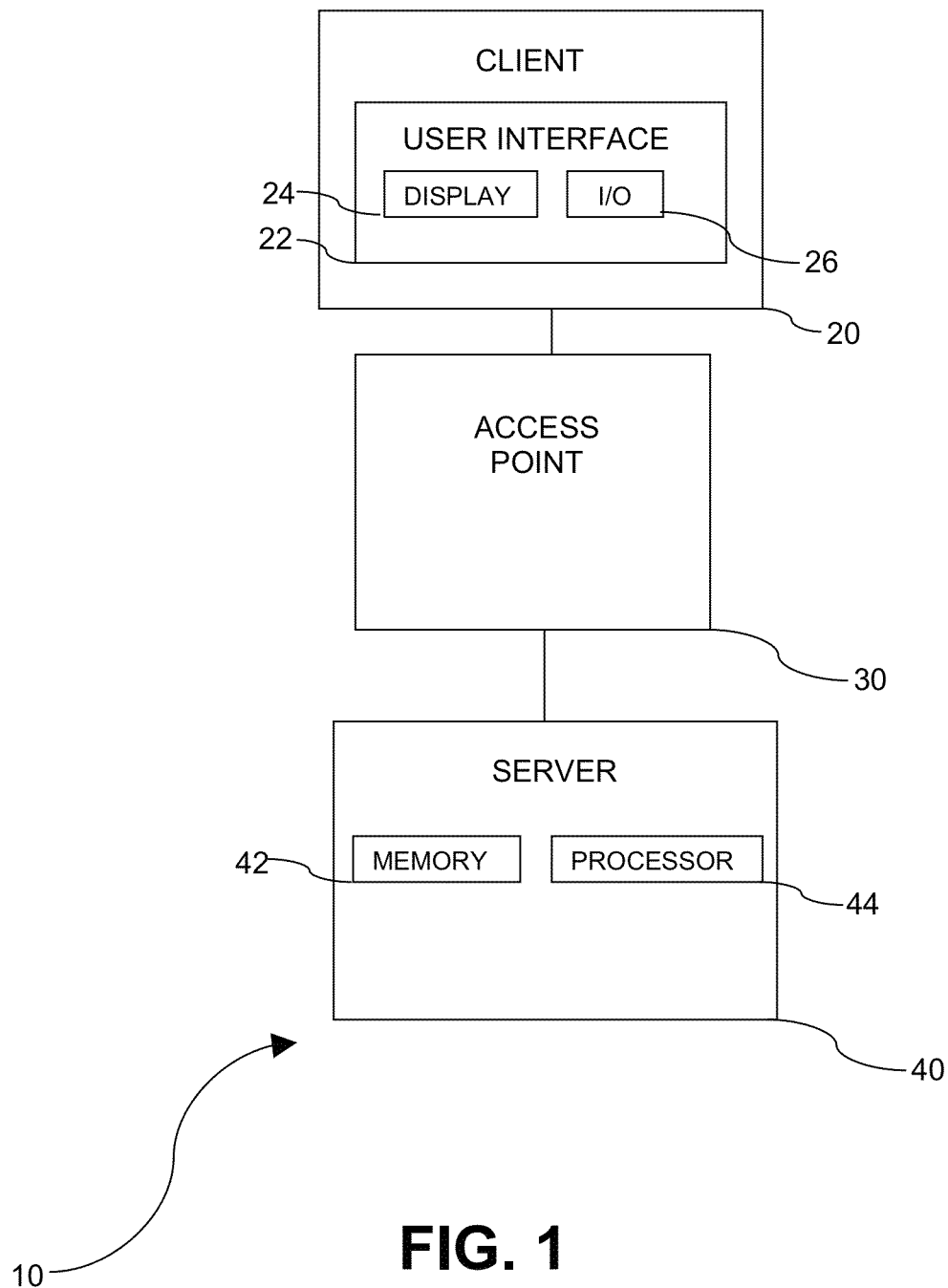
FIG. 1 is a schematic showing a computer system for implementing the present authentication method.

The present invention will now be described with reference to the figures. Referring specifically to FIG. 1, computer system 10 includes a client computer, an access point 30 and a server 40. The client computer 20 can be any computer which includes, but is not limited to, a personal computer, PDA, Smartphone, tablet computer, etc. The client computer 20 has a user interface 22 which includes a display 24 and an input/output device 26. The input/output device 26 can be any appropriate input/output device which is appropriate which includes, but is not limited to, a touch screen, a trackball and mouse. The user interface 22 is used for authentication and access to the server 40 through the access point 30.

The access point 30 can be a public access point, such as a Wi-Fi hot spot, home network connected to the Internet or other computer network, a wireless Internet Service Provider ("ISP") or cell phone carrier.

Figure 2:
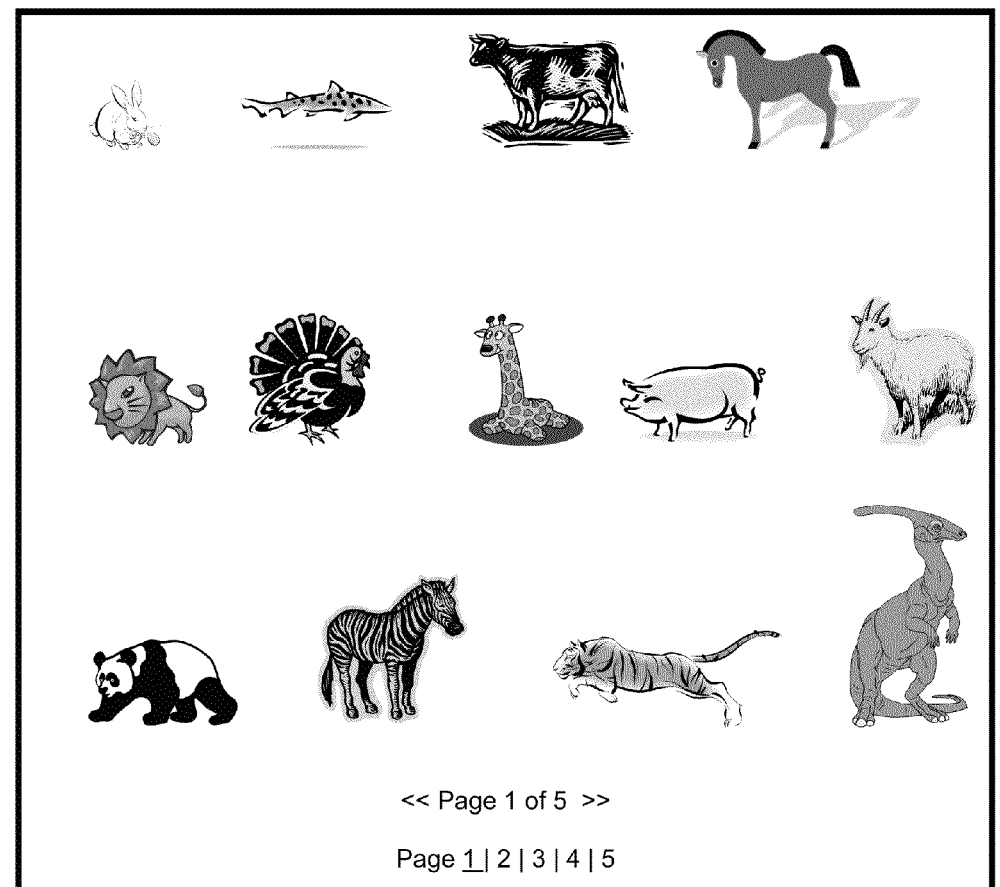
FIG. 2 is a screen of a user interface used during pre-authentication or enrollment, in accordance with the present secure authentication method.
Figure 6:
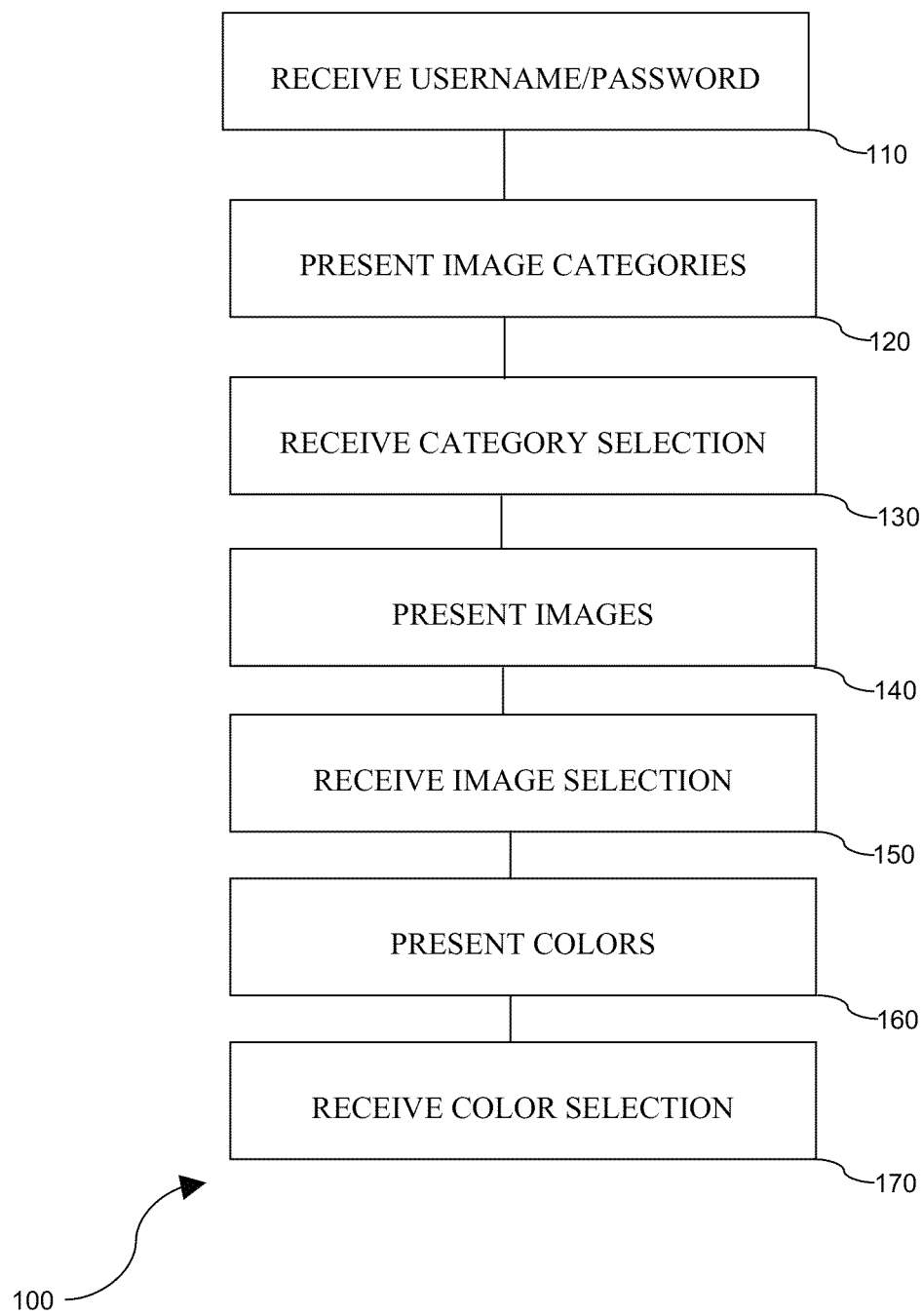
FIG. 6 is a flowchart, in accordance with one aspect of a secure authentication method, in accordance with the present invention.

Referring now to FIGS. 1 and 2, along with FIG. 6, a pre-selection authentication or enrollment method 100 is used by a user to initially set up his or her computer account on a server 40. A user, using interface 24, logs into server 40 by entering his or her username or Login ID and password for his or her user account which was previously created in memory 42 (step 110). Next, the user is presented with a plurality of image categories on display 24, which may include 1 to 10 or more categories (step 120). For example, the use may be presented with four categories: animals, buildings, vehicles and flowers (step 120). The user, via input/output device 26, selects one of the categories, e.g., animals (step 130).

Next, server 40 receives the user's selection of image categories (step 130) and then server 40 presents to the user, via display 24a (FIG. 2), a plurality of different images (step 140). For example, up to 100 different images or pictures which correspond to the category selected at step 130. For example, display 24a is one of five pages and displays the first 13 animals. Next, the user selects one of the images from the plurality of images presented on display 24a, and this selection is sent to server 40 (step 150).

Figure 3:
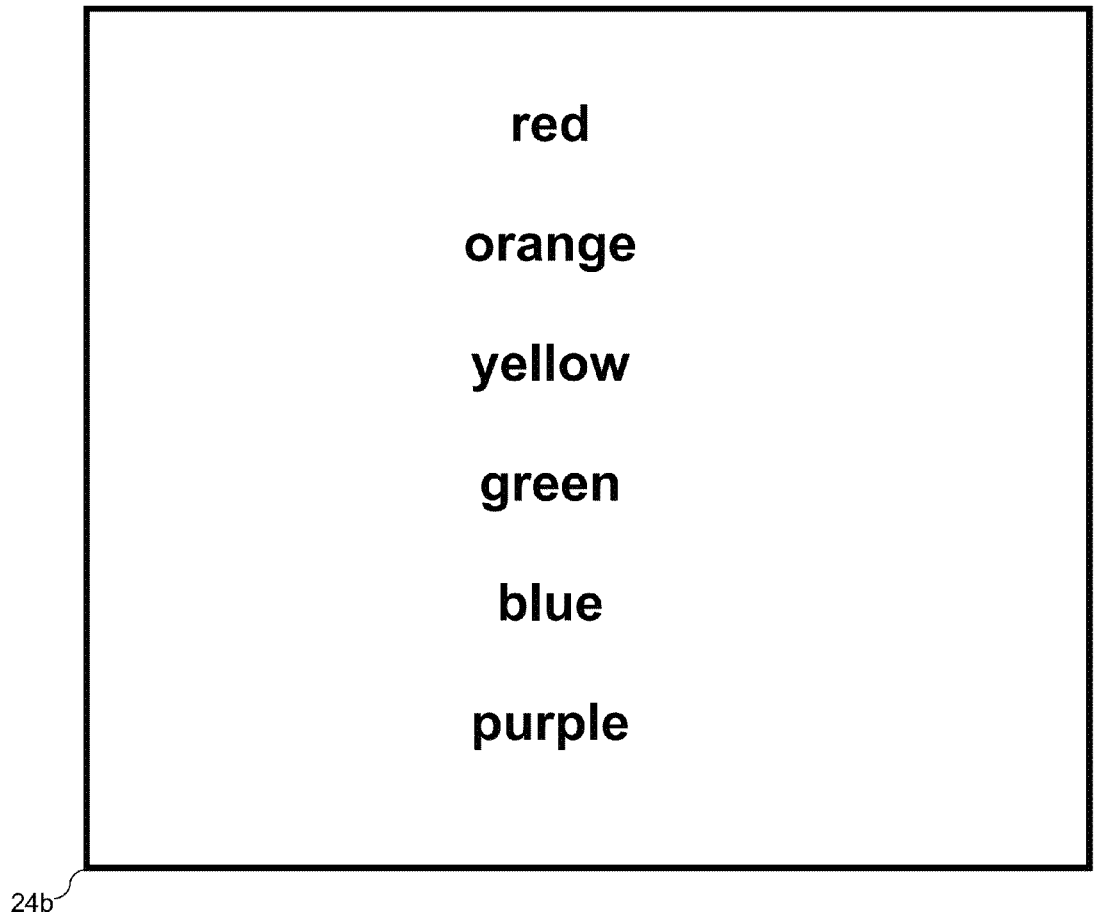
FIG. 3 is another user interface screen used during pre-authentication, in accordance with the present method.

Server 40 then presents to the user, via display 24b (FIG. 3), a plurality of background colors from which to choose (step 160). For example, red, orange, yellow, green, blue and purple (step 160). The user then selects one of the colors as the background color (step 170) for the image selected at step 150.

Figure 4:
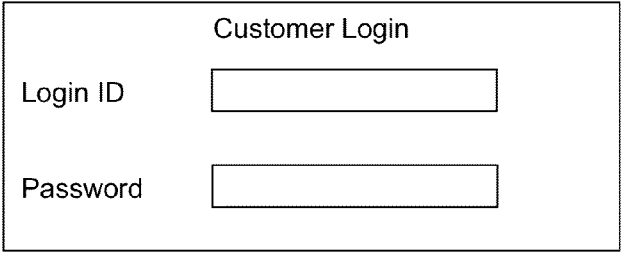
FIG. 4 depicts a user interface screen used during authentication, in accordance with the present method.
Figure 7:
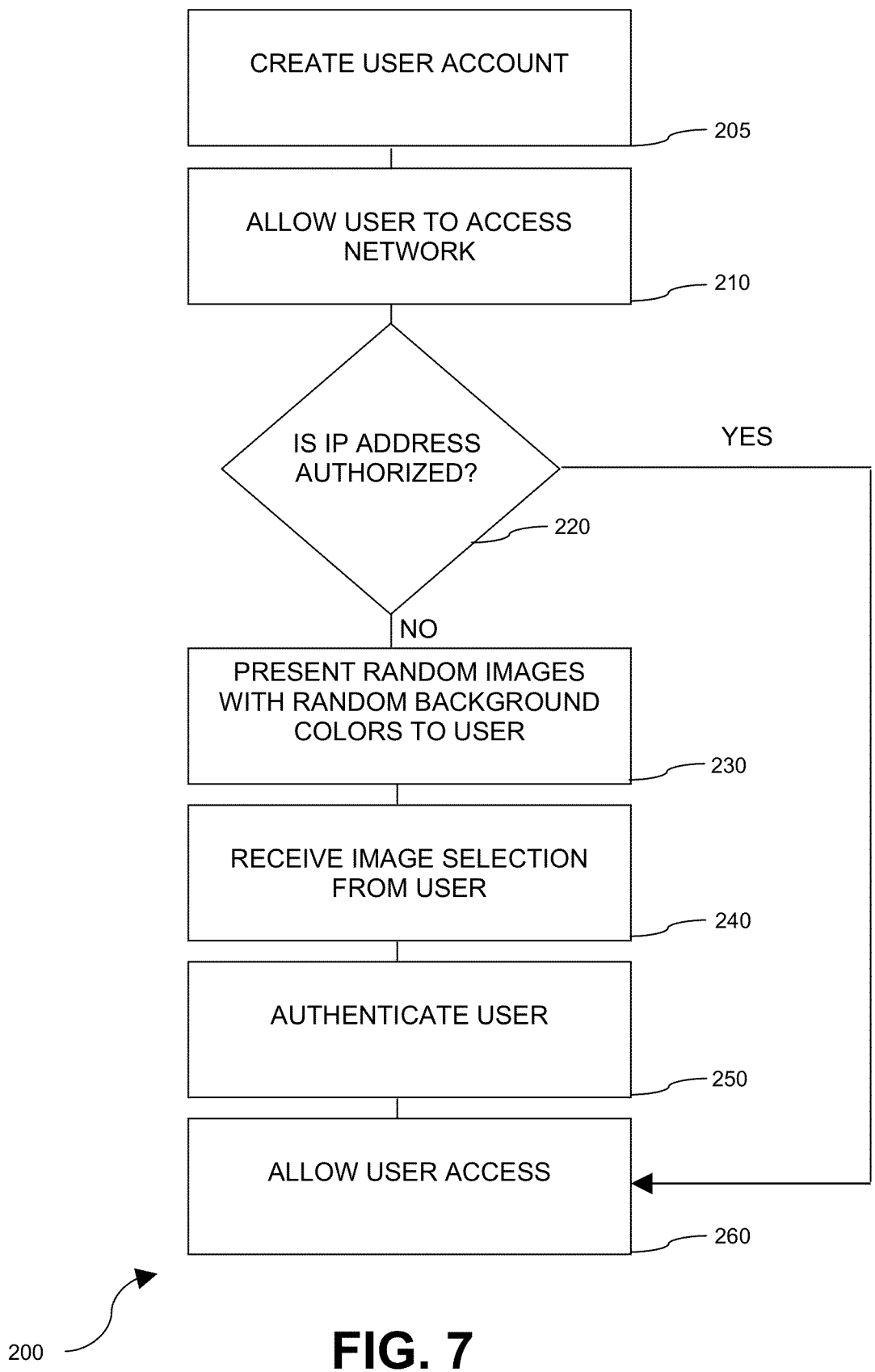
FIG. 7 is a flow chart, in accordance with another method for secure authentication, in accordance with the present invention.

Referring to FIG. 4 and the flowchart of FIG. 7, along with FIG. 1, method 200 authenticates a user for access to server 40. After the user account has been created on server 40 in memory 42 using processor 44 (step 205), such as via method 100 (FIG. 6), a user wishing to gain access to server 40 uses the client computer 20 through access point 30 to request access to server 40 (step 210). The user is first prompted to enter his or her username and password via interface 22 (step 210), as shown in the display 24c of FIG. 4.

Server 40 then determines if an IP address associated with the access point 30 corresponds to an IP address which has previously been identified as an approved access point (step 220). For example, approved access points or IP addresses include IP addresses internal to a company which hosts or owns server 40, private home IP addresses, IP addresses of a particular vendor, etc. The approved IP addresses are stored in memory 42. Upon a user seeking access to server 40, the processor 44 identifies the IP address of access point 30 and compares that IP address with approved IP addresses in memory 42 (step 220). If it is a preapproved IP address, the user is allowed to have access to the server 40 (step 260).

If the IP address access point 30 is not a preapproved IP address (step 220), the user will be presented with a plurality of random images on the user interface display 24d (FIG. 5), some of which include the same image, but with different backgrounds (step 230). If the server 40 determines that the access point IP address is not a preapproved IP address, the user is presented with a plurality of randomly displayed images having different background colors, as shown in FIG. 5 (step 230).

Figure 5:
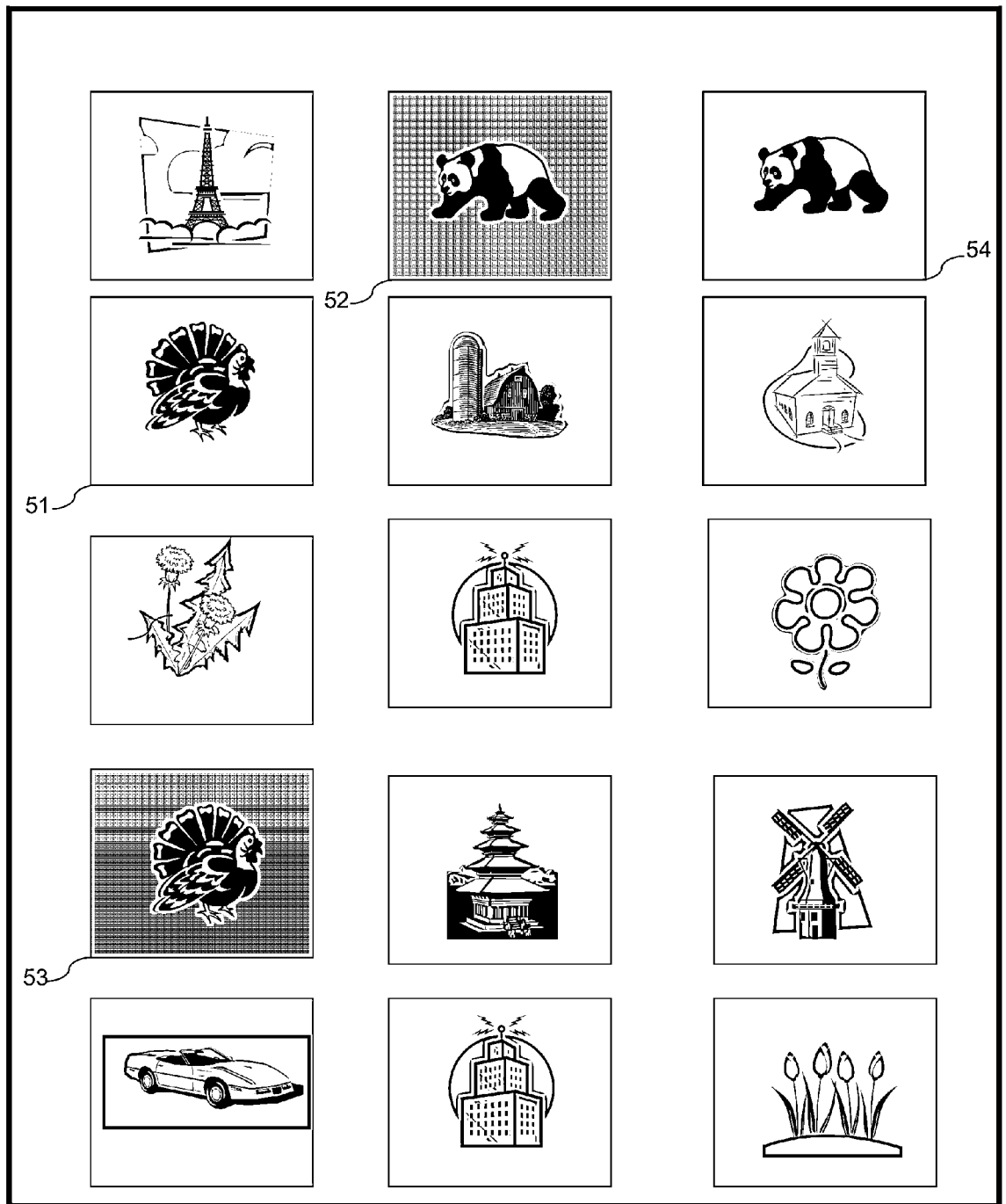
FIG. 5 is another user interface screen used during authentication, in accordance with the present invention.

In order to enhance security, the images are randomly displayed on the screen and, preferably, at least two images have different background colors, as shown in FIG. 5. For example, FIG. 5 depicts two images of a turkey 51, 53 and two images of a panda 52, 54. Turkey 51 has a different background color than turkey 53, shown as white and gray, respectively, in the black and white FIG. 5, noting that many different colors are possible, in accordance with the present disclosure. Similarly, panda 52 has a different background color than panda 54. The user selects the correct image having the correct background color which the user has previously selected, e.g., panda 52 having a gray background (step 240). The user selection, via input/output device 26, is sent to the server 40 via access point 30 (step 240). The processor 44 determines whether the selection is correct by comparing it with user account data in memory 42 and, if it is, allows the user to have access to the server 40 (step 260).

Figure 8:
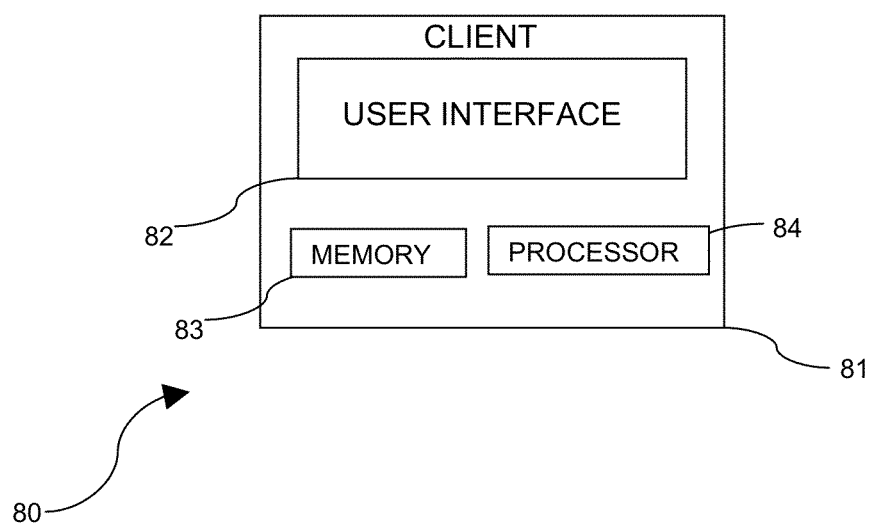
FIG. 8 is a schematic showing another computer system for implementing the present method.

Referring now to FIG. 8, computer system 80 includes a client computer or PDA 81 having a user interface 82, memory 83 and processor 84. The computer system 80 can incorporate aspects of the present secure authentication method in order to limit access to the computer 81 to authorized users. For example, a user can preselect one of a plurality of images and a specific background color which is stored in memory 83. In order for a user to have access to the client computer 81, a user must select the correct image with background color from among a plurality of images with background colors presented to the user on interface 82.

The present secure authentication method provides advantages and features over prior authentication methods. Presenting random images with random background colors on a user interface, along with a preselected image with background color, prevents phishing, since each time a user wishes to gain access to the server or computer network, the images will be in a different location. As a result, spyware cannot merely record keystrokes or image locations corresponding to where a user previously selected a correct image, as the next time a user wishes to gain access to the server or computer network, the correct image likely will be in a different location, since the images are randomly displayed on the user interface.

Although the invention has been described above in relation to preferred embodiments thereof, it will be understood by those skilled in the art that variations and modifications can be effected in these preferred embodiments without departing from the scope and spirit of the invention.

The invention claimed is:

1. A method for secure authentication, said method comprising:
creating a user account for a user using a computer processor, the user account comprising account information including a username, an image selected from a plurality of images, and a background color selected from a plurality of colors for the background color of the image;
allowing a user to access a computer via a computer user interface; and
a) presenting a plurality of random images having random background colors in random order using a computer processor on the user interface, at least two of the plurality of random images are the same image with a respective different background color, one of the plurality of random images is the image with background color associated with the user account;
b) receiving a selection from the user of one of the images presented on the computer user interface; and
c) authenticating the user as an authorized user using a computer processor if the user selected the image with background color corresponding to the user account;
d) determining an IP address for the user interface and authenticating the user without presenting the plurality of images and receiving a selection from the user of an image, if the IP address is an approved IP address.

2. The method of claim 1, wherein the creating a user account comprises:
presenting the user with a plurality of image categories;
receiving a selection from the user of one of the plurality of image categories;
presenting the user with a plurality of images corresponding to selected image category;
receiving a selection from the user of one of the plurality of images;
presenting the user with a plurality of background colors; and
receiving a selection from the user of one of the plurality of background colors.

3. The method of claim 1, wherein presenting the plurality of random images comprises presenting at least two images which are the same image with a respective different background color.

4. The method of claim 3, wherein presenting the plurality of random images in a random order comprises presenting the images in a random location on the user interface.

5. The method of claim 1, wherein receiving a selection from the user comprises receiving a selection from a user in the form of a mouse click or touchscreen selection of a location on the user interface corresponding to the image selected by the user.

6. The method of claim 1, further comprising receiving a username and password from the user via the computer user interface prior to presenting the user with the plurality of images, and wherein the account information includes the user password.

7. The method of claim 1, further comprising comparing the IP address of the user interface with a database of IP addresses and identifying the user interface as an authorized IP address if the IP address is in the database of IP addresses.

8. The method of claim 1, wherein authenticating the user allows the user to have access to a server via a computer network accessible via the user interface.

9. A method for secure authentication, said method comprising:
(a) creating a user account for a user using a computer processor, the user account comprising account information including a username, an image selected from a plurality of images, and a background color selected from a plurality of colors for the background color of the image;
(b) allowing a user to access a computer via a computer user interface;
(c) determining an IP address for the computer user interface using a computer processor;
(d) comparing the IP address with IP addresses in an IP address database using a computer processor;

wherein,
if the IP address is in the database of IP addresses,
   (e) identifying the user interface as an authorized IP address and authenticating the user as an authorized user; and
if the IP address is not in the database of IP addresses the method further comprises:
   (f) presenting a plurality of random images having random background colors in random order on the user interface, one of the plurality of random images is the image with the background color associated with the user account;
   (g) receiving a selection from the user of one of the images presented on the user interface; and
   (h) authenticating the user as an authorized user if the user selected the image with background color corresponding to the user account.

10. The method of claim 9, wherein the creating a user account comprises:
   presenting the user with a plurality of image categories;
   receiving a selection from the user of one of the plurality of image categories;
   presenting the user with a plurality of images corresponding to selected image category;
   receiving a selection from the user of one of the plurality of images;
   presenting the user with a plurality of background colors; and
   receiving a selection from the user of one of the plurality of background.

11. The method of claim 9, wherein presenting the plurality of random images comprises presenting at least two images which are the same image with a respective different background color.

12. The method of claim 11, wherein presenting the plurality of random images in a random order comprises presenting the images in a random location on the user interface.

13. The method of claim 9, wherein receiving a selection from the user comprises receiving a selection from a user in the form of a mouse click or touchscreen selection of a location on the user interface corresponding to the image selected by the user.

14. The method of claim 9, further comprising receiving a username and password from the user via the computer user interface prior to presenting the user with the plurality of images, and wherein the account information includes the user password.

15. A system having secure authentication, said system comprising:
   a computer user interface;
   computer memory; and
   a computer processor adapted for executing computer instruction, said instruction comprising:
   determining an IP address for the computer user interface using the computer processor;
   comparing the IP address with IP addresses in an IP address database using a computer processor;
   wherein,
   if the IP address is in the database of IP addresses,
      identifying the user interface as an authorized IP address and authenticating the user as an authorized user; and
   if the IP address is not in the database of IP addresses the method further comprises:
      presenting a plurality of random images having random background colors in random order on the user interface, one of the plurality of random images is the image with the background color associated with the user account;
      receiving a selection from the user of one of the images presented on the user interface; and
      authenticating the user as an authorized user if the user selected the image with background color corresponding to the user account.

* * * * *